US012649822B2

(12) United States Patent
Yamasaki et al.

(10) Patent No.: US 12,649,822 B2
(45) Date of Patent: Jun. 9, 2026

(54) VINYL CHLORIDE RESIN PLASTICIZING AGENT, VINYL CHLORIDE RESIN COMPOSITION, AND MOLDED ARTICLE THEREOF

(71) Applicant: DIC Corporation, Tokyo (JP)

(72) Inventors: Masaru Yamasaki, Chihara (JP); Takafumi Noguchi, Ichihara (JP); Hiroki Tokoro, Ichihara (JP)

(73) Assignee: DIC Corporation, Tokyo (JP)

( * ) Notice: Subject to any disclaimer, the term of this patent is extended or adjusted under 35 U.S.C. 154(b) by 846 days.

(21) Appl. No.: 17/799,058

(22) PCT Filed: Jan. 28, 2021

(86) PCT No.: PCT/JP2021/002951
§ 371 (c)(1),
(2) Date: Aug. 11, 2022

(87) PCT Pub. No.: WO2021/176901
PCT Pub. Date: Sep. 10, 2021

(65) Prior Publication Data

US 2023/0073584 A1 Mar. 9, 2023

(30) Foreign Application Priority Data

Mar. 4, 2020 (JP) ................................ 2020-036825

(51) Int. Cl.
*C08L 27/06* (2006.01)
*C08G 63/16* (2006.01)

(52) U.S. Cl.
CPC .............. *C08G 63/16* (2013.01); *C08L 27/06* (2013.01)

(58) Field of Classification Search
CPC ...... C08G 63/16; C08G 63/20; C08G 63/916; C08G 63/672; C08L 27/06
See application file for complete search history.

(56) References Cited

U.S. PATENT DOCUMENTS

| | | | |
|---|---|---|---|
| 4,029,627 | A | 6/1977 | Chang et al. |
| 7,348,380 | B2 | 3/2008 | Koube et al. |
| 2006/0025544 | A1 | 2/2006 | Koube et al. |
| 2013/0289301 | A1 | 10/2013 | Bastioli et al. |
| 2016/0333169 | A1 | 11/2016 | Bastioli et al. |
| 2016/0347931 | A1 | 12/2016 | Bastioli et al. |
| 2017/0321036 | A1 | 11/2017 | Wyart et al. |

FOREIGN PATENT DOCUMENTS

| | | | |
|---|---|---|---|
| JP | S61-78827 | A | 4/1986 |
| JP | S63-218750 | A | 9/1988 |
| JP | H01-284520 | A | 11/1989 |
| JP | H01-294730 | A | 11/1989 |
| JP | H11-322907 | A | 11/1999 |
| JP | 3082231 | B2 * | 8/2000 |
| JP | 2004-161801 | A | 6/2004 |
| JP | 2017-502156 | A | 1/2017 |
| WO | 2016/046490 | A1 | 3/2016 |

* cited by examiner

*Primary Examiner* — Kumar R Bhushan
(74) *Attorney, Agent, or Firm* — Troutman Pepper Locke LLP; James E. Armstrong, IV

(57) ABSTRACT

Provided is a plasticizer which can impart excellent heat resistance to a molded article of a vinyl chloride resin composition. Specifically, provided is a plasticizer for vinyl chloride resin, wherein the plasticizer is a polyester represented by the following formula (1) or (2), wherein, in the formulae (1) and (2), $B_{11}$ represents an aliphatic monocarboxylic acid residue having 7 to 20 carbon atoms, $B_{12}$ represents an aliphatic monocarboxylic acid residue having 7 to 20 carbon atoms, $B_{21}$ represents an aliphatic monoalcohol residue having 6 to 10 carbon atoms, $B_{22}$ represents an aliphatic monoalcohol residue having 6 to 10 carbon atoms, G represents an alkylene glycol residue having 3 to 10 carbon atoms or an oxyalkylene glycol residue having 3 to 10 carbon atoms, A represents an alkylenedicarboxylic acid residue having 6 to 12 carbon atoms, and each of m and n represents the number of repeating units in parentheses.

(1)

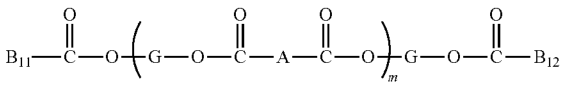

(2)

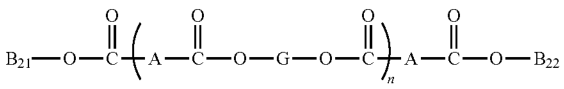

20 Claims, No Drawings

VINYL CHLORIDE RESIN PLASTICIZING AGENT, VINYL CHLORIDE RESIN COMPOSITION, AND MOLDED ARTICLE THEREOF

TECHNICAL FIELD

The present invention relates to a plasticizer for vinyl chloride resin, a vinyl chloride resin composition and a molded article obtained therefrom.

BACKGROUND ART

A vinyl chloride resin (PVC) is one of representative plastics, and is inexpensive and has physical properties including excellent heat resistance, and hence has been used in a wide variety of applications. The vinyl chloride resin has hard and brittle properties and therefore, before using the vinyl chloride resin, a plasticizer is generally added to the vinyl chloride resin so that the resin is flexible.

As a plasticizer used for the vinyl chloride resin, higher alkyl esters of polybasic acid, such as a phthalate, an adipate, and a trimellitate, have been known, and, from the viewpoint of the balance between the price and performance, a phthalate is generally used.

However, there is concern that the phthalate can adversely affect a human body, and the development of a plasticizer other than the phthalate is required.

PTL 1 discloses an isosorbide epoxy diester as a plasticizer for vinyl chloride resin. The plasticizer disclosed is a plasticizer which uses oleic acid as a raw material so as to reduce the adverse effect on a human body. However, this plasticizer has unsatisfactory performance as a plasticizer for vinyl chloride resin.

CITATION LIST

Patent Literature

PTL 1: International Patent Application Publication No. 2016/046490

SUMMARY OF INVENTION

Technical Problem

A task to be achieved by the present invention is to provide a plasticizer which can impart excellent heat resistance to a molded article of a vinyl chloride resin composition, and which has excellent nonmigratory properties.

Solution to Problem

The present invention is directed to a plasticizer for vinyl chloride resin, wherein the plasticizer is a polyester represented by the following formula (1) or (2):

[Chem. 1]

(1)

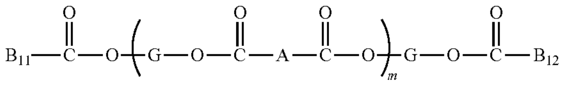

-continued (2)

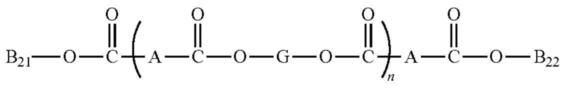

wherein, in the formulae (1) and (2), $B_{11}$ represents an aliphatic monocarboxylic acid residue having 7 to 20 carbon atoms, $B_{12}$ represents an aliphatic monocarboxylic acid residue having 7 to 20 carbon atoms, $B_{21}$ represents an aliphatic monoalcohol residue having 6 to 10 carbon atoms, $B_{22}$ represents an aliphatic monoalcohol residue having 6 to 10 carbon atoms, G represents an alkylene glycol residue having 3 to 10 carbon atoms or an oxyalkylene glycol residue having 3 to 10 carbon atoms, A represents an alkylenedicarboxylic acid residue having 6 to 12 carbon atoms, and each of m and n represents the number of repeating units in parentheses, and each of m and n is independently an integer of 1 or more, wherein A's for the individual repeating units in parentheses are the same or different, and G's for the individual repeating units in parentheses are the same or different.

Advantageous Effects of Invention

By the present invention, there can be provided a plasticizer which can impart excellent heat resistance to a molded article of a vinyl chloride resin composition, and which has such excellent nonmigratory properties that the plasticizer does not migrate from the molded article to other things.

DESCRIPTION OF EMBODIMENTS

Hereinbelow, an embodiment of the present invention will be described. The embodiments described below should not be construed as limiting the scope of the present invention, and can be appropriately changed or modified as long as the effects of the present invention are not sacrificed.

[Plasticizer for Vinyl Chloride Resin]

The plasticizer for vinyl chloride resin of the present invention is a polyester represented by the formula (1) or (2) below. Hereinafter, the polyester represented by the formula (1) below and the polyester represented by the formula (2) below are frequently collectively referred to as "the polyester of the invention".

[Chem. 2]

(1)

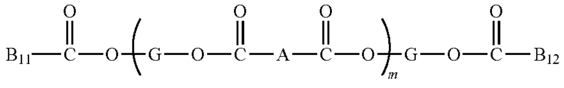

(2)

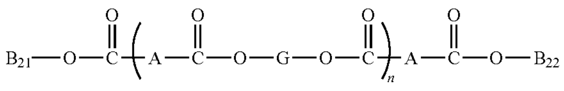

Wherein, in the formulae (1) and (2), $B_{11}$ represents an aliphatic monocarboxylic acid residue having 7 to 20 carbon atoms, $B_{12}$ represents an aliphatic monocarboxylic acid residue having 7 to 20 carbon atoms, $B_{21}$ represents an aliphatic monoalcohol residue having 6 to 10 carbon atoms, $B_{22}$ represents an aliphatic monoalcohol residue having 6 to 10 carbon atoms, G represents an alkylene glycol residue having 3 to 10 carbon atoms or an oxyalkylene glycol residue having 3 to 10 carbon atoms, A represents an alkylenedicarboxylic acid residue having 6 to 12 carbon atoms, and each of m and n represents the number of repeating units in parentheses, and each of m and n is independently an integer of 1 or more, wherein A's for the individual repeating units in parentheses are the same or different, and G's for the individual repeating units in parentheses are the same or different.

In the invention, the term "carboxylic acid residue" indicates an organic group that remains after removing a carboxyl group from a carboxylic acid. The number of carbon atoms of the "carboxylic acid residue" does not include the carbon atom in the carboxyl group.

In the invention, the term "alcohol residue" indicates an organic group that remains after removing a hydroxyl group from an alcohol.

In the invention, the term "glycol residue" indicates an organic group that remains after removing a hydroxyl group from a glycol.

Examples of aliphatic monocarboxylic acid residues having 7 to 20 carbon atoms for $B_{11}$ and $B_{12}$ include a caprylic acid residue, a capric acid residue, a lauric acid residue, a myristic acid residue, a pentadecylic acid residue, a palmitic acid residue, a margaric acid residue, a stearic acid residue, and an arachidic acid residue.

The aliphatic monocarboxylic acid residue having 7 to 20 carbon atoms for $B_{11}$ and $B_{12}$ may have in the aliphatic chain a secondary hydroxyl group and/or a tertiary hydroxyl group, and examples of such residues include a 12-hydroxystearic acid residue.

$B_{11}$ and $B_{12}$ are preferably an aliphatic monocarboxylic acid residue having 11 to 17 carbon atoms, more preferably a lauric acid residue, a myristic acid residue, a palmitic acid residue, or a stearic acid residue.

When at least one of $B_{11}$ and $B_{12}$ in the polyester represented by the formula (1) is an aliphatic monocarboxylic acid residue having 11 to 17 carbon atoms, the polyester can exhibit a satisfactory effect as a plasticizer for vinyl chloride resin.

Examples of aliphatic monoalcohol residues having 6 to 10 carbon atoms for $B_{21}$ and $B_{22}$ include normaloctanol, 2-ethylhexanol, and isononyl alcohol.

$B_{21}$ and $B_{22}$ are preferably an aliphatic monoalcohol residue having 7 to 10 carbon atoms, more preferably an aliphatic monoalcohol residue having 8 or 9 carbon atoms.

Examples of alkylenedicarboxylic acid residues having 6 to 12 carbon atoms for A include an azelaic acid residue, a sebacic acid residue, a dodecanedicarboxylic acid residue, a cyclohexanedicarboxylic acid residue, and a hexahydrophthalic acid residue.

The alkylenedicarboxylic acid residue having 6 to 12 carbon atoms for A is preferably an alkylenedicarboxylic acid residue having 7 to 10 carbon atoms, more preferably an azelaic acid residue, a sebacic acid residue, or a dodecanedioic acid residue, further preferably a sebacic acid residue.

Examples of alkylene glycol residues having 3 to 10 carbon atoms for G include a 1,2-propylene glycol residue, a 1,3-propylene glycol residue, a 1,2-butanediol residue, a 1,3-butanediol residue, a 2-methyl-1,3-propanediol residue, a 1,4-butanediol residue, a 1,5-pentanediol residue, a 2,2-dimethyl-1,3-propanediol (neopentyl glycol) residue, a 2,2-diethyl-1,3-propanediol (3,3-dimethylolpentane) residue, a 2-n-butyl-2-ethyl-1,3-propanediol (3,3-dimethylolheptane) residue, a 3-methyl-1,5-pentanediol residue, a 1,6-hexanediol residue, a cyclohexanedimethanol residue, a 2,2,4-trimethyl-1,3-pentanediol residue, a 2-ethyl-1,3-hexanediol residue, a 2-methyl-1,8-octanediol residue, a 1,9-nonanediol residue, a 1,10-decanediol residue, and a diethylene glycol residue.

The alkylene glycol residue having 3 to 10 carbon atoms for G is preferably an alkylene glycol residue having 3 to 6 carbon atoms, more preferably a 1,2-propanediol residue, a 1,3-butanediol residue, a 1,4-butanediol residue, a neopentyl glycol residue, a 2-methyl-1,3-propanediol residue, a 3-methyl-1,5-pentanediol residue, a 1,6-hexanediol residue, or a diethylene glycol residue.

The oxyalkylene glycol residue having 3 to 10 carbon atoms for G corresponds to, for example, the above-mentioned alkylene glycol residue having 3 to 10 carbon atoms, which has one carbon atom replaced by an oxygen atom, and examples of such residues include a diethylene glycol residue, a triethylene glycol residue, a tetraethylene glycol residue, a dipropylene glycol residue, and a tripropylene glycol residue.

The oxyalkylene glycol residue having 3 to 10 carbon atoms for G is preferably an oxyalkylene glycol residue having 4 to 6 carbon atoms, more preferably a diethylene glycol residue or a triethylene glycol residue.

With respect to the upper limit of each of m and n, there is no particular limitation, but the upper limit is, for example, 15.

The polyester of the invention may be used in the form of, for example, a mixture of the polyester resins of the formula (1) above wherein m's are different from each other and/or a mixture of the polyester resins of the formula (2) above wherein n's are different from each other. In this case, the average of m's is, for example, in the range of from 1 to 9, and the average of n's is, for example, in the range of from 1 to 9.

The average of each of m and n can be determined from the number average molecular weight of the polyester.

The polyester of the invention has a number average molecular weight (Mn) of, for example, 500 to 5,000, preferably 1,000 to 3,500, more preferably 1,200 to 2,800, further preferably 1,600 to 2,400.

When the number average molecular weight (Mn) of the polyester of the invention is in the above-mentioned range, a polyester plasticizer having excellent heat resistance, low temperature resistance, and nonmigratory properties can be obtained.

The number average molecular weight (Mn) is a value determined by conversion using polystyrene based on gel permeation chromatography (GPC) measurement, and is measured by the method described in the Examples.

The polyester of the invention preferably has an acid value of 2.0 or less, more preferably 1.0 or less.

The polyester of the invention preferably has a hydroxyl value of 15 or less, more preferably 10 or less.

The polyester of the invention preferably has a viscosity of 7,000 mPa·s or less, more preferably 5,000 mPa·s or less.

The acid value, hydroxyl value, and viscosity of the polyester of the invention are measured by the methods described in the Examples.

The appearance of the polyester of the invention varies depending on the number average molecular weight, composition, or the like, but is generally a liquid, solid, or paste state at ordinary room temperature or the like.

The polyester of the invention is obtained using reaction raw materials containing, for example, at least one member selected from a monocarboxylic acid, a monoalcohol, a glycol, and a dicarboxylic acid. The term "reaction raw materials" used here means raw materials constituting the polyester of the invention, which means that the solvent and catalyst which do not constitute the polyester are not included in the raw materials.

With respect to the method for producing the polyester of the invention, there is no particular limitation, and the polyester can be produced by a known method, and can be produced by the below-mentioned method.

The reaction raw materials for the polyester of the invention need to contain at least one member selected from a monocarboxylic acid, a monoalcohol, a glycol, and a dicarboxylic acid, and may contain an additional raw material.

With respect to the reaction raw materials for the polyester of the invention, it is preferred that 90% by mass or more of the total of the reaction raw materials is at least one member selected from a monocarboxylic acid, a monoalcohol, a glycol, and a dicarboxylic acid, and it is more preferred that the reaction raw materials are composed only of at least one member selected from a monocarboxylic acid, a monoalcohol, a glycol, and a dicarboxylic acid.

The monocarboxylic acid used in the production of the polyester of the invention is a monocarboxylic acid corresponding to the aliphatic monocarboxylic acid residue having 7 to 20 carbon atoms for $B_{11}$ and $B_{12}$, and, with respect to the monocarboxylic acid used, one monocarboxylic acid may be used, or two or more monocarboxylic acids may be used in combination.

The monoalcohol used in the production of the polyester of the invention is a monoalcohol corresponding to the aliphatic monoalcohol residue having 6 to 10 carbon atoms for $B_{21}$ and $B_{22}$, and, with respect to the monoalcohol used, one monoalcohol may be used, or two or more monoalcohols may be used in combination.

The glycol used in the production of the polyester of the invention is a glycol corresponding to the alkylene glycol residue having 3 to 10 carbon atoms or oxyalkylene glycol residue having 3 to 10 carbon atoms for G, and, with respect to the glycol used, one glycol may be used, or two or more glycols may be used in combination.

The dicarboxylic acid used in the production of the polyester of the invention is a dicarboxylic acid corresponding to the alkylenedicarboxylic acid residue having 6 to 12 carbon atoms for A, and, with respect to the dicarboxylic acid used, one dicarboxylic acid may be used, or two or more dicarboxylic acids may be used in combination.

The polyester represented by the formula (1) above wherein m is 1 or more can be obtained by, for example, the method shown below.

Method 1: a method in which a monocarboxylic acid, a dicarboxylic acid, and a glycol constituting the respective residues of the polyester represented by the formula (1) are charged at the same time and reacted with each other.

Method 2: a method in which a dicarboxylic acid and a glycol constituting the corresponding residues of the polyester represented by the formula (1) are reacted under conditions such that the equivalent of a hydroxyl group is larger than the equivalent of a carboxyl group to obtain a polyester having a hydroxyl group at an end of the principal chain, and then the obtained polyester resin and a monocarboxylic acid constituting $B_{11}$ and $B_{12}$ are reacted with each other.

The polyester represented by the formula (2) above wherein n is 1 or more can be obtained by, for example, the method shown below.

Method 3: a method in which a monoalcohol, a dicarboxylic acid, and a glycol constituting the respective residues of the polyester represented by the formula (2) are charged at the same time and reacted with each other.

Method 4: a method in which a dicarboxylic acid and a glycol constituting the corresponding residues of the polyester represented by the formula (2) are reacted under conditions such that the equivalent of a carboxyl group is larger than the equivalent of a hydroxyl group to obtain a polyester having a carboxyl group at an end of the principal chain, and then the obtained polyester and a monoalcohol constituting $B_{21}$ and $B_{22}$ are reacted with each other.

With respect to the aliphatic monocarboxylic acid used in the production of the polyester represented by the formula (1) above, a hydrogenated vegetable oil fatty acid may be used. Examples of the hydrogenated vegetable oil fatty acids include a hydrogenated coconut oil fatty acid, a hydrogenated palm kernel oil fatty acid, a hydrogenated palm oil fatty acid, a hydrogenated olive oil fatty acid, a hydrogenated castor oil fatty acid, and a hydrogenated rapeseed oil fatty acid. These fatty acids are obtained by hydrolyzing and hydrogenating the oils respectively obtained from coconut, palm kernel, palm, olive, castor-oil plant, and rapeseed, and each of them is a mixture of two or more long-chain aliphatic monocarboxylic acids including an aliphatic monocarboxylic acid having 8 to 21 carbon atoms.

With respect to the aliphatic monocarboxylic acid used in the production of the polyester represented by the formula (1) above, the above-mentioned vegetable oil fatty acid that is not hydrogenated may be used as long as the effects of the present invention are not sacrificed. Further, the vegetable oil fatty acid is not limited to those mentioned above.

When the hydrogenated vegetable oil fatty acid is used as the aliphatic monocarboxylic acid used in the production of the polyester represented by the formula (1) above, the polyester is obtained in the form of a mixture of two or more polyesters represented by the formula (1).

The polyester of the invention is preferably a polyester which is obtained using an alkylene glycol having 3 to 10 carbon atoms, an alkylenedicarboxylic acid having 8 to 14 carbon atoms, and a hydrogenated vegetable oil fatty acid as reaction raw materials.

With respect to the polyester, all the reaction raw materials can be biomass-derived raw materials when the aliphatic monocarboxylic acid is a hydrogenated vegetable oil fatty acid, the alkylenedicarboxylic acid is sebacic acid, and the alkylene glycol is at least one member selected from the group consisting of 1,2-propanediol, 1,3-butanediol, 1,4-butanediol, neopentyl glycol, and diethylene glycol.

In the production of the polyester of the invention, with respect to the reaction for the reaction raw materials, an esterification reaction is advantageously conducted, if necessary, in the presence of an esterification catalyst, for example, at a temperature in the range of from 180 to 250° C. for a period of time in the range of from 10 to 25 hours.

Conditions for the esterification reaction, such as a temperature and a time, are not particularly limited and can be appropriately selected.

Examples of the esterification catalysts include titanium catalysts, such as tetraisopropyl titanate and tetrabutyl titanate; tin catalysts, such as dibutyltin oxide; and organic sulfonic acid catalysts, such as p-toluenesulfonic acid.

The amount of the esterification catalyst used can be appropriately selected, but the esterification catalyst is generally used in an amount in the range of from 0.001 to 0.1 part by mass, relative to 100 parts by mass of the total amount of the reaction raw materials.

[Vinyl Chloride Resin Composition]

The vinyl chloride resin composition of the invention contains the plasticizer for vinyl chloride resin of the invention and a vinyl chloride resin. In the invention, the vinyl chloride resin includes a homopolymer of vinyl chloride, a homopolymer of vinylidene chloride, a copolymer containing vinyl chloride as an essential component, a copolymer containing vinylidene chloride as an essential component, and the like.

When the vinyl chloride resin is a copolymer containing vinyl chloride as an essential component or a copolymer containing vinylidene chloride as an essential component, examples of comonomers that can be copolymerized with vinyl chloride or vinylidene chloride include α-olefins, such as ethylene, propylene, and 1-butene; conjugated dienes, such as butadiene and isoprene; vinyl alcohol, styrene, acrylonitrile, vinyl acetate, vinyl propionate, fumaric acid, a fumarate, maleic acid, a maleate, maleic anhydride, acrylic acid, an acrylate, methacrylic acid, a methacrylate, and isoprenol.

The polymerization degree of the vinyl chloride resin is generally in the range of from 300 to 5,000, preferably in the range of from 400 to 3,500, more preferably in the range of from 700 to 3,000. When the polymerization degree of the vinyl chloride resin is in the above range, a molded article having high heat resistance can be obtained, and further the vinyl chloride resin composition having excellent processability can be achieved.

The vinyl chloride resin can be produced by a known method, and examples of such methods include suspension polymerization conducted in the presence of an oil-soluble polymerization catalyst, and emulsion polymerization conducted in an aqueous medium in the presence of a water-soluble polymerization catalyst.

With respect to the vinyl chloride resin, a commercially available product may be used. Examples of commercially available products of the vinyl chloride resin include TH-640, TH-700, TH-800 (each of which is manufactured by Taiyo Vinyl Corporation); S-1004, S-1008, PSH-10 (each of which is manufactured by Kaneka Corporation); TK-700, TK-800, TK-1300 (each of which is manufactured by Shin-Etsu Polymer Co., Ltd.); and ZEST800Z, ZEST1000Z, ZEST1300Z (each of which is manufactured by Shin Dai-ichi Vinyl Corporation).

In the vinyl chloride resin composition of the invention, from the viewpoint of the compatibility with the vinyl chloride resin and the like, the amount of the contained plasticizer for vinyl chloride resin of the invention, relative to 100 parts by mass of the vinyl chloride resin, is preferably in the range of from 10 to 100 parts by mass, more preferably in the range of from 30 to 100 parts by mass, further preferably in the range of from 40 to 80 parts by mass, especially preferably in the range of from 50 to 80 parts by mass.

The vinyl chloride resin composition of the invention needs to contain at least a vinyl chloride resin and the plasticizer for vinyl chloride resin of the invention, and may contain a plasticizer (additional plasticizer) other than the plasticizer for vinyl chloride resin of the invention, an additional additive, and the like.

Examples of the additional plasticizers include benzoates, such as diethylene glycol dibenzoate; phthalates, such as dibutyl phthalate (DBP), di-2-ethylhexyl phthalate (DOP), diisononyl phthalate (DINP), diisodecyl phthalate (DIDP), diundecyl phthalate (DUP), and ditridecyl phthalate (DTDP); terephthalates, such as bis(2-ethylhexyl) terephthalate (DOTP); isophthalates, such as bis(2-ethylhexyl) isophthalate (DOIP); pyromellitates, such as tetra-2-ethylhexyl pyromellitate (TOPM); aliphatic dibasic acid esters, such as di-2-ethylhexyl adipate (DOA), diisononyl adipate (DINA), diisodecyl adipate (DIDA), di-2-ethylhexyl sebacate (DOS), and diisononyl sebacate (DINS); phosphates, such as tri-2-ethylhexyl phosphate (TOP) and tricresyl phosphate (TCP); alkyl esters of a polyhydric alcohol, such as pentaerythritol; polyester having a molecular weight of 800 to 4,000, which is synthesized by forming polyester from a dibasic acid, such as adipic acid, and a glycol; epoxidized esters, such as epoxidized soybean oil and epoxidized linseed oil; alicyclic dibasic acid esters, such as diisononyl hexahydrophthalate; fatty acid glycol esters, such as dicapric acid 1,4-butanediol; tributyl acetylcitrate (ATBC); a chlorinated paraffin obtained by chlorinating a paraffin wax or n-paraffin; chlorinated fatty acid esters, such as a chlorinated stearate; and higher fatty acid esters, such as butyl oleate.

When the additional plasticizer is used in the vinyl chloride resin composition of the invention, the amount of the additional plasticizer contained is, for example, in the range of from 10 to 300 parts by mass, preferably in the range of from 20 to 200 parts by mass, relative to 100 parts by mass of the plasticizer for vinyl chloride resin of the invention.

Examples of the additional additives include a flame retardant, a stabilizer, a stabilizing auxiliary, a coloring agent, a processing auxiliary, a filler, an antioxidant, an ultraviolet light absorber, a light stabilizer, a lubricant, an antistatic agent, and a crosslinking auxiliary.

Examples of the flame retardants include inorganic compounds, such as aluminum hydroxide, antimony trioxide, magnesium hydroxide, and zinc borate; phosphorus compounds, such as cresyldiphenyl phosphate, trischloroethyl phosphate, trischloropropyl phosphate, and trisdichloropropyl phosphate; and halogen compounds, such as a chlorinated paraffin.

When a flame retardant is incorporated into the vinyl chloride resin composition, the amount of the flame retardant incorporated is generally in the range of from 0.1 to 20 parts by mass, relative to 100 parts by mass of the vinyl chloride resin.

Examples of the stabilizers include metal soap compounds, such as lithium stearate, magnesium stearate, magnesium laurate, calcium ricinolate, calcium stearate, barium laurate, barium ricinolate, barium stearate, zinc octylate, zinc laurate, zinc ricinolate, and zinc stearate; organotin compounds, such as dimethyltin bis-2-ethylhexyl thioglycolate, dibutyltin maleate, dibutyltin bisbutyl maleate, and dibutyltin dilaurate; antimony mercaptide compounds; and lanthanoid-containing compounds, such as lanthanum oxide and lanthanum hydroxide.

When a stabilizer is incorporated into the vinyl chloride resin composition, the amount of the stabilizer incorporated is generally in the range of from 0.1 to 20 parts by mass, relative to 100 parts by mass of the vinyl chloride resin.

Examples of the stabilizing auxiliaries include phosphite compounds, such as triphenyl phosphite, monooctyldiphenyl phosphite, and tridecyl phosphite; beta-diketone compounds, such as acetylacetone and benzoylacetone; polyol compounds, such as glycerol, sorbitol, pentaerythritol, and polyethylene glycol; perchlorate compounds, such as barium perchlorate and sodium perchlorate; hydrotalcite compounds; and zeolite.

When a stabilizing auxiliary is incorporated into the vinyl chloride resin composition, the amount of the stabilizing auxiliary incorporated is generally in the range of from 0.1 to 20 parts by mass, relative to 100 parts by mass of the vinyl chloride resin.

Examples of the coloring agents include carbon black, lead sulfide, white carbon, titanium white, lithopone, red iron oxide, antimony sulfide, chrome yellow, chrome green, cobalt bule, and molybdenum orange.

When a coloring agent is incorporated into the vinyl chloride resin composition, the amount of the coloring agent incorporated is generally in the range of from 1 to 100 parts by mass, relative to 100 parts by mass of the vinyl chloride resin.

Examples of the processing auxiliaries include a liquid paraffin, a polyethylene wax, stearic acid, stearic acid amide, ethylenebisstearic acid amide, butyl stearate, and calcium stearate.

When a processing auxiliary is incorporated into the vinyl chloride resin composition, the amount of the processing auxiliary incorporated is generally in the range of from 0.1 to 20 parts by mass, relative to 100 parts by mass of the vinyl chloride resin.

Examples of the fillers include calcium carbonate, silica, alumina, clay, talc, diatomaceous earth, and metal oxides, such as ferrite; fibers or powders of glass, carbon, a metal, or the like; glass bulb, graphite, aluminum hydroxide, barium sulfate, magnesium oxide, magnesium carbonate, magnesium silicate, and calcium silicate.

When a filler is incorporated into the vinyl chloride resin composition, the amount of the filler incorporated is generally in the range of from 1 to 100 parts by mass, relative to 100 parts by mass of the vinyl chloride resin.

Examples of the antioxidants include phenol compounds, such as 2,6-di-tert-butylphenol, tetrakis[methylene-3-(3,5-tert-butyl-4-hydroxyphenol)propionate]methane, and 2-hydroxy-4-methoxybenzophenone; sulfur compounds, such as alkyl disulfide, thiodipropionate, and benzothiazole; phosphorus compounds, such as trisnonylphenyl phosphite, diphenylisodecyl phosphite, triphenyl phosphite, and tris(2,4-di-tert-butylphenyl) phosphite; and organometallic compounds, such as zinc dialkyldithiophosphate and zinc diaryldithiophosphate.

When an antioxidant is incorporated into the vinyl chloride resin composition, the amount of the antioxidant incorporated is generally in the range of from 0.2 to 20 parts by mass, relative to 100 parts by mass of the vinyl chloride resin.

Examples of the ultraviolet light absorbers include salicylate compounds, such as phenyl salicylate and p-tert-butylphenyl salicylate; benzophenone compounds, such as 2-hydroxy-4-n-octoxybenzophenone and 2-hydroxy-4-n-methoxybenzophenone; benzotriazole compounds, such as 5-methyl-1H-benzotriazole and 1-dioctylaminomethylbenzotriazole, and cyanoacrylate compounds.

When an ultraviolet light absorber is incorporated into the vinyl chloride resin composition, the amount of the ultraviolet light absorber incorporated is generally in the range of from 0.1 to 10 parts by mass, relative to 100 parts by mass of the vinyl chloride resin.

Examples of the light stabilizers include hindered amine light stabilizers. Specific examples include bis(2,2,6,6-tetramethyl-4-piperidyl) sebacate, bis(1,2,2,6,6-pentamethyl-4-piperidyl) sebacate, and methyl 1,2,2,6,6-pentamethyl-4-piperidyl sebacate (mixture), bis(1,2,2,6,6-pentamethyl-4-piperidyl)[[3,5-bis(1,1-dimethylethyl)-4-hydroxyphenyl] methyl]butyl malonate, bis(2,2,6,6-tetramethyl-1(octyloxy)-4-piperidyl) decanedioate and a reaction product of 1,1-dimethylethylhydroperoxide and octane, 4-benzoyloxy-2,2,6,6-tetramethylpiperidine, a mixture of 2,2,6,6-tetramethyl-4-piperidinol and a higher fatty acid ester, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, a polycondensation product of dimethyl succinate and 4-hydroxy-2,2,6,6-tetramethyl-1-piperidineethanol, poly{ (6-(1,1,3,3-tetramethylbutyl)amino-1,3,5-triazin-2,4-diyl){ (2,2,6,6-tetramethyl-4-piperidyl) imino}hexamethylene { (2,2,6,6-tetramethyl-4-piperidyl) imino}}, a polycondensation product of dibutylamine•1,3,5-triazineN•N'-bis(2,2,6,6-tetramethyl-4-piperidyl-1,6-hexamethylenediamine and N-(2,2,6,6-tetramethyl-4-piperidyl)butylamine, and N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine.

When a light stabilizer is incorporated into the vinyl chloride resin composition, the amount of the light stabilizer incorporated is generally in the range of from 0.1 to 10 parts by mass, relative to 100 parts by mass of the vinyl chloride resin.

Examples of the lubricants include silicone, a liquid paraffin, a paraffin wax, fatty acid metal salts, such as a stearic acid metal salt and a lauric acid metal salt; a fatty acid amide, a fatty acid wax, and a higher fatty acid wax.

When a lubricant is incorporated into the vinyl chloride resin composition, the amount of the lubricant incorporated is generally in the range of from 0.1 to 10 parts by mass, relative to 100 parts by mass of the vinyl chloride resin.

Examples of the antistatic agents include anionic antistatic agents of an alkylsulfonate type, an alkyl ether carboxylic acid type, or a dialkylsulfosuccinate type; nonionic antistatic agents, such as a polyethylene glycol derivative, a sorbitan derivative, and a diethanolamine derivative; cationic antistatic agents, such as quaternary ammonium salts of an alkylamideamine type, an alkyldimethylbenzyl type or the like, and an organic acid salt or hydrochloride of an alkylpyridinium type; and amphoteric antistatic agents of an alkylbetaine type, an alkylimidazoline type or the like.

When an antistatic agent is incorporated into the vinyl chloride resin composition, the amount of the antistatic agent incorporated is generally in the range of from 0.1 to 10 parts by mass, relative to 100 parts by mass of the vinyl chloride resin.

Examples of the crosslinking auxiliaries include multifunctional monomers, such as tetraethylene glycol dimethacrylate, divinylbenzenediallyl phthalate, triallyl isocyanurate, trimethylolpropane triacrylate, tetramethylolmethane tetramethacrylate, and trimethoxyethoxyvinylsilane, and when a crosslinking auxiliary is incorporated into the vinyl chloride resin composition, the amount of the crosslinking auxiliary incorporated is generally in the range of from 0.5 to 30 parts by mass, relative to 100 parts by mass of the vinyl chloride resin.

The vinyl chloride resin composition of the invention can be produced by a known method.

For example, the vinyl chloride resin composition of the invention can be prepared by mixing a vinyl chloride resin, the plasticizer for vinyl chloride resin of the invention, and an optional component (the additional plasticizer and the additional additive) using a kneading machine, such as a blender, a planetary mixer, or a Banbury mixer.

A molded article is obtained by molding the vinyl chloride resin composition of the invention by a known molding method, such as vacuum molding, compression molding, extrusion molding, calender molding, press molding, blow molding, or powder molding.

The molded article obtained using the vinyl chloride resin composition of the invention can be used in, for example, an insulating tape, an insulating sheet, a wiring connector, a conductor wire coating material, pipes, such as a water pipe, pipe joints, guttering, such as rainwater guttering, window frame siding, a flat panel, a corrugated panel, automotive trims, such as automotive underbody coating, a dashboard, an instrument panel, a console, a door sheet, an undercarpet, a trunk sheet, and a door trim, various leathers, a decorative sheet, an agricultural film, a film for food packaging, various foam products, a hose, medical tubing, a tube for food, a gasket for refrigerator, packing, wall paper, a flooring material, boots, a curtain, a shoe sole, gloves, a waterstop, a toy, a decorative laminate, a blood bag, a transfer bag, a tarpaulin, a mat, a water barrier sheet, a civil engineering works sheet, roofing, a waterproof sheet, an industrial tape, a glass film, an erasing shield, and the like.

EXAMPLES

Hereinbelow, the present invention will be described in detail with reference to the following Examples and Comparative Examples. The following Examples should not be construed as limiting the scope of the present invention.

In the Examples of the invention, the values of acid value, hydroxyl value, and viscosity are those evaluated by the methods shown below.

<Method for Measuring an Acid Value>

An acid value was measured by the method in accordance with JIS K0070-1992.

<Method for Measuring a Hydroxyl Value>

A hydroxyl value was measured by the method in accordance with JIS K0070-1992.

<Method for Measuring a Viscosity>

A viscosity was measured by the method in accordance with JIS K6901-1986.

In the Examples of the invention, the number average molecular weight of the polyester is a value determined by conversion using polystyrene based on GPC measurement, and conditions for the measurement are as follows.

[Conditions for GPC Measurement]

Measuring apparatus: High-speed GPC apparatus "HLC-8320GPC", manufactured by Tosoh Corp.

Columns: "TSK GURDCOLUMN SuperHZ-L", manufactured by Tosoh Corp.+"TSK gel SuperHZM-M", manufactured by Tosoh Corp.+"TSK gel SuperHZM-M", manufactured by Tosoh Corp.+"TSK gel SuperHZ-2000", manufactured by Tosoh Corp.+"TSK gel SuperHZ-2000", manufactured by Tosoh Corp.

Detector: RI (differential refractometer)

Data processing: "EcoSEC Data Analysis version 1.07", manufactured by Tosoh Corp.

Column temperature: 40° C.

Developing solvent: Tetrahydrofuran

Flow rate: 0.35 mL/minute

Sample for measurement: 7.5 mg of a sample was dissolved in 10 ml of tetrahydrofuran, and the resultant solution was subjected to filtration using a microfilter and used as a sample for measurement.

Sample amount per injection: 20 μl

Standard sample: In accordance with the measurement manual for the above-mentioned "HLC-8320GPC", the below-shown monomodal polystyrenes having known molecular weights were used.

(Monomodal Polystyrenes)

"A-300", manufactured by Tosoh Corp.
"A-500", manufactured by Tosoh Corp.
"A-1000", manufactured by Tosoh Corp.
"A-2500", manufactured by Tosoh Corp.
"A-5000", manufactured by Tosoh Corp.
"F-1", manufactured by Tosoh Corp.
"F-2", manufactured by Tosoh Corp.
"F-4", manufactured by Tosoh Corp.
"F-10", manufactured by Tosoh Corp.
"F-20", manufactured by Tosoh Corp.
"F-40", manufactured by Tosoh Corp.
"F-80", manufactured by Tosoh Corp.
"F-128", manufactured by Tosoh Corp.
"F-288", manufactured by Tosoh Corp.

Example 1: Synthesis of Polyester Plasticizer A 808 g (4.0 mol) of sebacic acid and 450 g (5.0 mol) of 1,3-butanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 410 g (2.0 mol) of hydrogenated coconut oil fatty acid and 0.1 g of tetraisopropoxytitanium as an esterification catalyst were added, and the formed water was continuously removed. After the reaction, the water was distilled off under a reduced pressure at the same temperature, obtaining a polyester plasticizer A (number average molecular weight: 1,820; viscosity: 690 mPa·s; acid value: 0.5; hydroxyl value: 6.5).

The hydrogenated coconut oil fatty acid is a mixture of aliphatic monocarboxylic acids, which contains 5% by mass of octanoic acid (having 8 carbon atoms), 5% by mass of capric acid (having 10 carbon atoms), 51% by mass of lauric acid (having 12 carbon atoms), 18% by mass of myristic acid (having 14 carbon atoms), 10% by mass of palmitic acid (having 16 carbon atoms), and 11% by mass of octadecanoic acid (having 18 carbon atoms). With respect to the hydrogenated coconut oil fatty acid which is a mixture, the amount of the mixture used in the reaction was determined from a value calculated from the content and molecular weight of each of the above-mentioned fatty acids.

(Preparation of a Vinyl Chloride Resin Composition (1))

100 Parts by mass of a vinyl chloride resin (polymerization degree: 1,050; ZEST1000Z, manufactured by Shin Dai-ichi Vinyl Corporation), 50 parts by mass of the obtained polyester plasticizer A, and 5 parts by mass of a filler (GLECK MP-677D (calcium/zinc composite stabilizer), manufactured by Nissin Trading Co., Ltd.) were mixed with each other to obtain a vinyl chloride resin composition (1). Using the obtained vinyl chloride resin composition (1), the following evaluations were conducted.

(Evaluation of Plasticizing Performance of a Plasticizer)

The prepared vinyl chloride resin composition (1) was kneaded for 10 minutes by means of a two-roll heated to 170° C., and then the kneaded vinyl chloride resin composition (1) was subjected to molding using a mold (1.0 mm-thickness mold), by which a molded article having a thickness of 1.0 mm can be obtained, and using a pressing machine heated to 170° C., preparing a sheet having a thickness of 1.0 mm.

With respect to the obtained sheet, a 100% modulus (tensile stress at an elongation of 100%) and an elongation at break were evaluated in accordance with JIS K6251:2010. Specifically, using the sheet having a thickness of 1.0 mm, a tensile test was conducted under the conditions shown below, and a 100% modulus and an elongation at break were evaluated. The results are shown in Table 1.

The elongation at break is a value indicated by a percentage which is obtained by dividing a value, which is obtained by subtracting 20 mm that is the initial distance between chucks from a distance between chucks at a time when the sheet having a thickness of 1.0 mm broken in tensile, by 20 mm that is the distance between chucks.

Measuring Apparatus: Tensilon universal testing machine (manufactured by Orientec Co., Ltd.)

Shape of specimen: Dumbbell-shaped specimen 3

Distance between chucks: 20 mm

Pulling rate: 200 mm/minute

Atmosphere for measurement: temperature: 23° C.; humidity: 50%

The lower the 100% modulus value, the higher the effect of plasticizing the vinyl chloride resin. Further, the higher the elongation at break, the higher the effect of plasticizing the vinyl chloride resin.

(Evaluation of Heat Resistance Performance of a Molded Article)

The prepared vinyl chloride resin composition (1) was kneaded for 10 minutes by means of a two-roll heated to 170° C., and then the kneaded vinyl chloride resin composition (1) was subjected to molding using a mold (1.0 mm-thickness mold), by which a molded article having a thickness of 1.0 mm can be obtained, and using a pressing machine heated to 170° C., preparing a sheet having a thickness of 1.0 mm. From the prepared sheet having a thickness of 1.0 mm, a dumbbell-shaped specimen 3 as a dumbbell specimen was prepared in accordance with JIS K6251:2010.

With respect to the prepared dumbbell specimen, a heat aging test at 136° C.×168 hours was conducted in accordance with JIS K6257:2017. Before and after the heat aging test, a mass of the dumbbell specimen was individually measured, and a reduction ratio ((Mass before the heat aging test−Mass after the heat aging test)/Mass before the heat aging test) was determined. The results are shown in Table 1.

The smaller reduction ratio indicates that the polyester plasticizer A remains in the molded article after the heat aging test, and a heat resistance effect of the polyester plasticizer A can be expected.

With respect to the dumbbell specimen obtained after the heat aging test, an elongation at break was evaluated in the same manner as in the evaluation of plasticizing effect, and the (elongation of the dumbbell specimen after the heat aging test)/(elongation of the dumbbell specimen before the heat aging test) was evaluated as "elongation retention". The results are shown in Table 1.

(Evaluation of Low-Temperature Flexibility of a Molded Article)

The prepared vinyl chloride resin composition (1) was kneaded for 10 minutes by means of a two-roll heated to 170° C., and then the kneaded vinyl chloride resin composition (1) was subjected to molding using a mold (1.0 mm-thickness mold), by which a molded article having a thickness of 1.0 mm can be obtained, and using a pressing machine heated to 170° C., preparing a sheet having a thickness of 1.0 mm.

With respect to the obtained sheet, a flex temperature (unit: ° C.) was evaluated using a Clash-Berg flex temperature measurement testing machine in accordance with the test method described in JIS K6745:2015. The results are shown in Table 1. The lower the flex temperature, the more excellent the low temperature resistance.

(Evaluation of Nonmigratory Properties of a Plasticizer)

The prepared vinyl chloride resin composition (1) was kneaded for 10 minutes by means of a two-roll heated to 170° C., and then the kneaded vinyl chloride resin composition (1) was subjected to molding using a mold (1.0 mm-thickness mold), by which a molded article having a thickness of 1.0 mm can be obtained, and using a pressing machine heated to 170° C., preparing a sheet having a thickness of 1.0 mm.

The obtained sheet having a thickness of 1.0 mm was punched into a 6.0 mm×38 mm size and used as a test specimen. The test specimen was sandwiched between two acrylonitrile-butadiene-styrene resin (ABS resin) plates, two impact-resistant polystyrene resin (HIPS resin) plates, or two acrylonitrile-styrene resin (AS resin) plates, and maintained at 70° C.×72 hours while applying a load of 0.22 $kg/cm^2$. The degree of staining due to migration of the plasticizer to the ABS resin plates, HIPS resin plates, or AS resin plates was visually evaluated in accordance with the following criteria. The results are shown in Table 1.

A: No staining due to migration of the plasticizer is found.

B: Slight staining due to migration of the plasticizer is found.

C: Marked staining due to migration of the plasticizer is found.

(Compatibility)

The prepared vinyl chloride resin composition (1) was kneaded for 10 minutes by means of a two-roll heated to 170° C., and then the kneaded vinyl chloride resin composition (1) was subjected to molding using a mold (1.0 mm-thickness mold), by which a molded article having a thickness of 1.0 mm can be obtained, and using a pressing machine heated to 170° C., preparing a sheet having a thickness of 1.0 mm. The sheet was cut to prepare two sheets having a 5 cm×5 cm size and having a thickness of 1.0 mm. The two prepared sheets were stacked and allowed to stand under conditions at 70° C. and at a relative humidity of 95% for 7 days. Then, the state of the surface of the sheet and the stacked side of the sheets was evaluated in accordance with the following criteria. The results are shown in Table 1.

A: When visually inspecting the surface of the sheet and the stacked side of the sheets, for example, powdery or viscous foreign matter (bleeding) cannot be found, and, when touching the surface of the sheet and the stacked side of the sheets by a finger, bleeding cannot be found.

B: When visually inspecting the surface of the sheet and the stacked side of the sheets, bleeding can be found, or, when touching the surface of the sheet and the stacked side of the sheets by a finger, bleeding can be found.

Example 2: Synthesis of Polyester Plasticizer B 808 g (4.0 mol) of sebacic acid and 520 g (5.0 mol) of neopentyl glycol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 410 g (2.0 mol) of hydrogenated coconut oil fatty acid and 0.1 g of tetraisopropoxytitanium as an esterification catalyst were added, and the formed water was continuously removed. After the reaction, the water was distilled off under a reduced pressure at the same temperature, obtaining a polyester plasticizer B (number average molecular weight: 1,780; viscosity: 650 mPa·s; acid value: 0.5; hydroxyl value: 8.0).

A vinyl chloride resin composition (2) was prepared in substantially the same manner as in Example 1 except that the plasticizer B was used instead of the plasticizer A, and subjected to evaluation. The results are shown in Table 1.

Example 3: Synthesis of Polyester Plasticizer C 1,010 g (5.0 mol) of sebacic acid, 152 g (2.0 mol) of 1,2-propanediol, and 180 g (2.0 mol) of 1,3-butanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 410 g (2.0 mol) of hydrogenated coconut oil fatty acid and 0.1 g of tetraisopropoxytitanium as an esterification catalyst were added, and the formed water was continuously removed. After the reaction, the water was distilled off under a reduced pressure at the same temperature, obtaining a polyester plasticizer C (number average molecular weight: 1,860; viscosity: 680 mPa·s; acid value: 0.8; hydroxyl value: 6.0).

A vinyl chloride resin composition (3) was prepared in substantially the same manner as in Example 1 except that the plasticizer C was used instead of the plasticizer A, and subjected to evaluation. The results are shown in Table 1.

Example 4: Synthesis of Polyester Plasticizer D 1,010 g (5.0 mol) of sebacic acid and 472 g (4.0 mol) of 2-methyl-1,3-propanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 289 g (2.0 mol) of isononyl alcohol and 0.1 g of tetraisopropoxytitanium as an esterification catalyst were added, and the formed water was continuously removed. After the reaction, the water was distilled off under a reduced pressure at the same temperature, obtaining a polyester plasticizer D (number average molecular weight: 1,810; viscosity: 730 mPa·s; acid value: 0.3; hydroxyl value: 6.5).

A vinyl chloride resin composition (4) was prepared in substantially the same manner as in Example 1 except that the plasticizer D was used instead of the plasticizer A, and subjected to evaluation. The results are shown in Table 1.

Example 5: Synthesis of Polyester Plasticizer E 808 g (4.0 mol) of sebacic acid and 380 g (5.0 mol) of 1,2-propanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 410 g (2.0 mol) of hydrogenated coconut oil fatty acid and 0.1 g of tetraisopropoxytitanium as an esterification catalyst were added, and the formed water was continuously removed. After the reaction, the water was distilled off under a reduced pressure at the same temperature, obtaining a polyester plasticizer E (number average molecular weight: 1,800; viscosity: 700 mPa·s; acid value: 0.4; hydroxyl value: 7.0).

A vinyl chloride resin composition (5) was prepared in substantially the same manner as in Example 1 except that the plasticizer E was used instead of the plasticizer A, and subjected to evaluation. The results are shown in Table 1.

Example 6: Synthesis of Polyester Plasticizer F 1,010 g (5.0 mol) of sebacic acid, 236 g (2.0 mol) of 2-methyl-1,3-propanediol, and 208 g (2.0 mol) of neopentyl glycol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 260 g (2.0 mol) of 2-ethylhexanol and 0.1 g of tetraisopropoxytitanium as an esterification catalyst were added, and the formed water was continuously removed. After the reaction, the water was distilled off under a reduced pressure at the same temperature, obtaining a polyester plasticizer F (number average molecular weight: 1,830; viscosity: 770 mPa·s; acid value: 0.4; hydroxyl value: 6.0).

A vinyl chloride resin composition (6) was prepared in substantially the same manner as in Example 1 except that the plasticizer F was used instead of the plasticizer A, and subjected to evaluation. The results are shown in Table 1.

Example 7: Synthesis of Polyester Plasticizer G 808 g (4.0 mol) of sebacic acid, 225 g (2.5 mol) of 1,3-butanediol, and 295 g (2.5 mol) of 1,6-hexanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 260 g (2.0 mol) of 2-ethylhexanol and 0.1 g of tetraisopropoxytitanium as an esterification catalyst were added, and the formed water was continuously removed. After the reaction, the water was distilled off under a reduced pressure at the same temperature, obtaining a polyester plasticizer G (number average molecular weight: 2,300; viscosity: 2,800 mPa·s; acid value: 0.4; hydroxyl value: 7.6).

A vinyl chloride resin composition (7) was prepared in substantially the same manner as in Example 1 except that the plasticizer G was used instead of the plasticizer A, and subjected to evaluation. The results are shown in Table 1.

Example 8: Synthesis of Polyester Plasticizer H 1,010 g (5.0 mol) of sebacic acid and 473 g (4.0 mol) of 3-methyl-1,5-pentanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 289 g (2.0 mol) of isononyl alcohol and 0.1 g of tetraisopropoxytitanium as an esterification catalyst were added, and the formed water was continuously removed. After the reaction, the water was distilled off under a reduced pressure at the same temperature, obtaining a polyester plasticizer H (average molecular weight: 1,840; viscosity: 750 mPa·s; acid value: 0.6; hydroxyl value: 7.1).

A vinyl chloride resin composition (8) was prepared in substantially the same manner as in Example 1 except that the plasticizer H was used instead of the plasticizer A, and subjected to evaluation. The results are shown in Table 1.

Example 9: Synthesis of Polyester Plasticizer I 808 g (4.0 mol) of sebacic acid, 265 g (2.5 mol) of diethylene glycol, and 190 g (2.5 mol) of 1,2-propanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 410 g (2.0 mol) of hydrogenated coconut oil fatty acid and 0.1 g of tetraisopropoxytitanium as an esterification catalyst were added, and the formed water was continuously removed. After the reaction, the water was distilled off under a reduced pressure at the same temperature, obtaining a polyester plasticizer I (number average molecular weight: 1,740; viscosity: 610 mPa·s; acid value: 0.4; hydroxyl value: 7.2).

A vinyl chloride resin composition (9) was prepared in substantially the same manner as in Example 1 except that the plasticizer I was used instead of the plasticizer A, and subjected to evaluation. The results are shown in Table 1.

Example 10: Synthesis of Polyester Plasticizer J 1,010 g (5.0 mol) of sebacic acid, 236 g (2.0 mol) of 3-methyl-1,5-pentanediol, and 601 g (2.5 mol) of 12-hydroxystearic acid were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 260 g (2.0 mol) of 2-ethylhexanol and 0.1 g of tetraisopropoxytitanium as an esterification catalyst were added, and the formed water was continuously removed. After the reaction, the water was distilled off under a reduced pressure at the same temperature, obtaining a polyester plasticizer J (number average molecular weight: 1,830; viscosity: 620 mPa·s; acid value: 0.3; hydroxyl value: 5.9).

A vinyl chloride resin composition (10) was prepared in substantially the same manner as in Example 1 except that the plasticizer J was used instead of the plasticizer A, and subjected to evaluation. The results are shown in Table 1.

Example 11: Synthesis of Polyester Plasticizer K 1,010 g (5.0 mol) of sebacic acid, 180 g (2.0 mol) of 1,3-butanediol, and 180 g (2.0 mol) of 1,4-butanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 289 g (2.0 mol) of isononyl alcohol and 0.1 g of tetraisopropoxytitanium as an esterification catalyst were added, and the formed water was continuously removed. After the reaction, the water was distilled off under a reduced pressure at the same temperature, obtaining a polyester plasticizer K (number average molecular weight: 1,850; viscosity: 650 mPa·s; acid value: 0.6; hydroxyl value: 8.6).

A vinyl chloride resin composition (11) was prepared in substantially the same manner as in Example 1 except that the plasticizer K was used instead of the plasticizer A, and subjected to evaluation. The results are shown in Table 2.

Example 12: Synthesis of Polyester Plasticizer L 808 g (4.0 mol) of sebacic acid and 380 g (5.0 mol) of 1,2-propanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 400 g (2.0 mol) of lauric acid and 0.1 g of tetraisopropoxytitanium as an esterification catalyst were added, and the formed water was continuously removed. After the reaction, the water was distilled off under a reduced pressure at the same temperature, obtaining a polyester plasticizer L (number average molecular weight: 2,200; viscosity: 1,200 mPa·s; acid value: 0.8; hydroxyl value: 9.2).

A vinyl chloride resin composition (12) was prepared in substantially the same manner as in Example 1 except that the plasticizer L was used instead of the plasticizer A, and subjected to evaluation. The results are shown in Table 2.

Example 13: Synthesis of Polyester Plasticizer M 941 g (5.0 mol) of azelaic acid and 472 g (4.0 mol) of 2-methyl-1,3-propanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 289 g (2.0 mol) of isononyl alcohol and 0.1 g of tetraisopropoxytitanium as an esterification catalyst were added, and the formed water was continuously removed. After the reaction, the water was distilled off under a reduced pressure at the same temperature, obtaining a polyester plasticizer M (number average molecular weight: 1,810; viscosity: 730 mPa·s; acid value: 0.3; hydroxyl value: 6.5).

A vinyl chloride resin composition (13) was prepared in substantially the same manner as in Example 1 except that the plasticizer M was used instead of the plasticizer A, and subjected to evaluation. The results are shown in Table 2.

Comparative Example 1: Synthesis of Polyester Plasticizer N 606 g (3.0 mol) of adipic acid, 450 g (5.0 mol) of 2-methyl-1,3-propanediol, and 142 g (1.2 mol) of 3-methyl-1,5-pentanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 159 g (1.1 mol) of isononanol and 0.1 g of tetraisopropoxytitanium were added, and the formed water was continuously removed. After the reaction, the water was distilled off under a reduced pressure at the same temperature, obtaining a polyester plasticizer N (number average molecular weight: 1,800; viscosity: 800 mPa·s; acid value: 0.9; hydroxyl value: 9.0).

A vinyl chloride resin composition (1') in Comparative Example 1 was prepared in substantially the same manner as in Example 1 except that the plasticizer N was used instead of the plasticizer A, and subjected to evaluation. The results are shown in Table 2.

Comparative Example 2: Synthesis of Polyester Plasticizer O 730 g (5.0 mol) of adipic acid, 180 g (2.0 mol) of 1,3-butanediol, and 180 g (2.0 mol) of 1,4-butanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 289 g (2.0 mol) of isononyl alcohol and 0.1 g of tetraisopropoxytitanium as an esterification catalyst were added, and the formed water was continuously removed. After the reaction, the water was distilled off under a reduced pressure at the same temperature, obtaining a polyester plasticizer O (number average molecular weight: 1,850; viscosity: 810 mPa·s; acid value: 0.4; hydroxyl value: 4.8).

A vinyl chloride resin composition (2') in Comparative Example 2 was prepared in substantially the same manner as in Example 1 except that the plasticizer O was used instead of the plasticizer A, and subjected to evaluation. The results are shown in Table 2.

Comparative Example 3: Synthesis of Polyester Plasticizer P 584 g (4.0 mol) of adipic acid, 225 g (2.5 mol) of 1,3-butanediol, and 295 g (2.5 mol) of 1,6-hexanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 260 g (2.0 mol) of 2-ethylhexanol and 0.1 g of tetraisopropoxytitanium as an esterification catalyst were added, and the formed water was continuously removed. After the reaction, the water was distilled off under a reduced pressure at the same temperature, obtaining a polyester plasticizer P (number average molecular weight: 2,300; viscosity: 3,200 mPa·s; acid value: 0.6; hydroxyl value: 7.4).

A vinyl chloride resin composition (3') in Comparative Example 3 was prepared in substantially the same manner as in Example 1 except that the plasticizer P was used instead of the plasticizer A, and subjected to evaluation. The results are shown in Table 2.

Comparative Example 4: Synthesis of Polyester Plasticizer Q 584 g (4.0 mol) of adipic acid and 380 g (5.0 mol) of 1,2-propanediol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 410 g (2.0 mol) of hydrogenated coconut oil hardened fatty acid and 0.1 g of tetraisopropoxytitanium as an esterification catalyst were added, and the formed water was continuously removed. After the reaction, the water was distilled off under a reduced pressure at the same temperature, obtaining a polyester plasticizer Q (number average molecular weight: 1,800; viscosity: 600 mPa·s; acid value: 0.4; hydroxyl value: 7.0).

A vinyl chloride resin composition (4') in Comparative Example 4 was prepared in substantially the same manner as in Example 1 except that the plasticizer Q was used instead of the plasticizer A, and subjected to evaluation. The results are shown in Table 2.

Comparative Example 5: Synthesis of Polyester Plasticizer R 730 g (5.0 mol) of adipic acid, 236 g (2.0 mol) of 2-methyl-1,3-propanediol, and 208 g (2.0 mol) of neopentyl glycol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 260 g (2.0 mol) of 2-ethylhexanol and 0.1 g of tetraisopropoxytitanium as an esterification catalyst were added, and the formed water was continuously removed. After the reaction, the water was distilled off under a reduced pressure at the same temperature, obtaining a polyester plasticizer R (number average molecular weight: 1,830; viscosity: 4,000 mPa·s; acid value: 0.7; hydroxyl value: 6.9).

A vinyl chloride resin composition (5') in Comparative Example 5 was prepared in substantially the same manner as in Example 1 except that the plasticizer R was used instead of the plasticizer A, and subjected to evaluation. The results are shown in Table 2.

Comparative Example 6: Synthesis of Polyester Plasticizer S 1,010 g (5.0 mol) of sebacic acid, 136 g (2.2 mol) of ethylene glycol, and 167 g (2.2 mol) of propylene glycol were charged into a reaction vessel which is a four-necked flask having an internal volume of 2 litters and being equipped with a thermometer, a stirrer, and a reflux condenser, and the temperature of the resultant mixture was stepwise increased to 220° C. in a nitrogen gas stream while stirring. Then, 287 g (2.2 mol) of normaloctanol and 0.1 g of tetraisopropoxytitanium as an esterification catalyst were added, and heating at 210 to 220° C. was continued until the acid value became 2 or less, and the formed water was continuously removed. After the reaction, the water was distilled off under a reduced pressure at the same temperature, obtaining a polyester plasticizer S (number average molecular weight: 1,880).

The obtained plasticizer S was solidified at 23° C., and thus was unsuitable for a plasticizer for vinyl chloride resin, and therefore the same evaluation as in Example 1 was not conducted.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| 100% Modulus [Mpa] | 13.4 | 13.2 | 13.6 | 14.2 | 13.6 | 13.5 | 13.3 | 13.9 | 12.7 | 13.1 |

TABLE 1-continued

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Elongation [%] | | 379 | 402 | 383 | 320 | 396 | 329 | 383 | 356 | 409 | 344 |
| Heat aging reduction [%] | | 2.2 | 1.9 | 1.2 | 1.5 | 2.3 | 2.5 | 1.1 | 1.6 | 2.4 | 1.7 |
| Elongation retention [%] | | 94 | 98 | 105 | 94 | 90 | 98 | 102 | 93 | 91 | 95 |
| Low-temperature flex temperature [° C.] | | −14 | −15 | −13 | −9 | −16 | −12 | −11 | −12 | −16 | −13 |
| Nonmigratory properties | ABS | A | A | A | A | A | A | A | A | A | A |
| | HIPS | A | A | A | A | A | A | A | A | A | A |
| | AS | A | A | A | A | A | A | A | A | A | A |
| Compatibility | | A | A | A | A | A | A | A | A | A | A |

TABLE 2

| | | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|
| 100% Modulus [Mpa] | | 12.2 | 14.2 | 13.9 | 11.1 | 11.8 | 13.7 | 14.4 | 14.6 |
| Elongation [%] | | 325 | 368 | 387 | 355 | 332 | 329 | 323 | 318 |
| Heat aging reduction [%] | | 1.4 | 1.3 | 1.6 | 6.3 | 3.4 | 2.1 | 3.8 | 1.7 |
| Elongation retention [%] | | 113 | 99 | 98 | 86 | 89 | 96 | 93 | 97 |
| Low-temperature flex temperature [° C.] | | −12 | −10 | −11 | −21 | −16 | −10 | −8 | −6 |
| Nonmigratory properties | ABS | A | A | A | B | B | B | C | A |
| | HIPS | A | A | A | A | B | A | C | A |
| | AS | A | A | A | C | C | C | C | C |
| Compatibility | | A | A | A | A | A | A | A | A |

From Tables 1 and 2, it has been found that the plasticizers in Examples 1 to 13 can impart excellent heat resistance to a molded article of a vinyl chloride resin composition, and further have excellent nonmigratory properties. On the other hand, it has been found that the polyester plasticizers in Comparative Examples 1 to 5 having an adipic acid residue which is an alkylenedicarboxylic acid residue having 4 carbon atoms have unsatisfactory heat resistance and nonmigratory properties.

The invention claimed is:

1. A plasticizer for vinyl chloride resin, the plasticizer being a polyester which is obtained by polymerizing reaction raw materials consisting of an alkylene glycol having 3 to 10 carbon atoms, an alkylenedicarboxylic acid having 8 to 14 carbon atoms, and a hydrogenated vegetable oil fatty acid.

2. The plasticizer for vinyl chloride resin according to claim 1, wherein the hydrogenated vegetable oil fatty acid is at least one member selected from the group consisting of a hydrogenated coconut oil fatty acid, a hydrogenated palm kernel oil fatty acid, a hydrogenated palm oil fatty acid, a hydrogenated olive oil fatty acid, a hydrogenated castor oil fatty acid, and a hydrogenated rapeseed oil fatty acid.

3. The plasticizer for vinyl chloride resin according to claim 1, wherein the alkylene glycol having 3 to 10 carbon atoms is at least one member selected from the group consisting of 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, cyclohexanedimethanol, 2,2,4-trimethyl-1,3-pentanediol, 2-ethyl-1,3-hexanediol, 2-methyl-1,8-octanediol, 1,9-nonanediol, 1,10-decanediol, and diethylene glycol.

4. The plasticizer for vinyl chloride resin according to claim 1, wherein the alkylenedicarboxylic acid having 8 to 14 carbon atoms is at least one member selected from the group consisting of azelaic acid, sebacic acid, dodecanedicarboxylic acid, cyclohexanedicarboxylic acid, and hexahydrophthalic acid.

5. The plasticizer for vinyl chloride resin according to claim 1, which has a number average molecular weight in the range of from 500 to 5,000.

6. A vinyl chloride resin composition containing the plasticizer for vinyl chloride resin according to claim 1, and a vinyl chloride resin.

7. The vinyl chloride resin composition according to claim 6, wherein the amount of the contained plasticizer for vinyl chloride resin is in the range of from 10 to 100 parts by mass, relative to 100 parts by mass of the vinyl chloride resin.

8. A molded article which is obtained from the vinyl chloride resin composition according to claim 6.

9. The plasticizer for vinyl chloride resin according to claim 2, wherein the alkylene glycol having 3 to 10 carbon atoms is at least one member selected from the group consisting of 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3- dimethylolpentane), 2-n-butyl-2-ethyl-1,3-propanediol (3,3-dimethylolheptane), 3-methyl-1,5-pentanediol, 1,6-hexanediol, cyclohexanedimethanol, 2,2,4-trimethyl-1,3-pentanediol, 2-ethyl-1,3-hexanediol, 2-methyl-1,8-octanediol, 1,9-nonanediol, 1,10-decanediol, and diethylene glycol.

10. The plasticizer for vinyl chloride resin according to claim 2, wherein the alkylenedicarboxylic acid having 8 to 14 carbon atoms is at least one member selected from the group consisting of azelaic acid, sebacic acid, dodecanedicarboxylic acid, cyclohexanedicarboxylic acid, and hexahydrophthalic acid.

11. The plasticizer for vinyl chloride resin according to claim 3, wherein the alkylenedicarboxylic acid having 8 to 14 carbon atoms is at least one member selected from the group consisting of azelaic acid, sebacic acid, dodecanedicarboxylic acid, cyclohexanedicarboxylic acid, and hexahydrophthalic acid.

12. The plasticizer for vinyl chloride resin according to claim 9, wherein the alkylenedicarboxylic acid having 8 to 14 carbon atoms is at least one member selected from the group consisting of azelaic acid, sebacic acid, dodecanedicarboxylic acid, cyclohexanedicarboxylic acid, and hexahydrophthalic acid.

13. The plasticizer for vinyl chloride resin according to claim 2, which has a number average molecular weight in the range of from 500 to 5,000.

14. The plasticizer for vinyl chloride resin according to claim 3, which has a number average molecular weight in the range of from 500 to 5,000.

15. The plasticizer for vinyl chloride resin according to claim 4, which has a number average molecular weight in the range of from 500 to 5,000.

16. A vinyl chloride resin composition containing the plasticizer for vinyl chloride resin according to claim 2, and a vinyl chloride resin.

17. A vinyl chloride resin composition containing the plasticizer for vinyl chloride resin according to claim 3, and a vinyl chloride resin.

18. A vinyl chloride resin composition containing the plasticizer for vinyl chloride resin according to claim 4, and a vinyl chloride resin.

19. A vinyl chloride resin composition containing the plasticizer for vinyl chloride resin according to claim 5, and a vinyl chloride resin.

20. A molded article which is obtained from the vinyl chloride resin composition according to claim 7.

* * * * *